(12) United States Patent  
Miller et al.

(10) Patent No.: US 8,504,406 B2  
(45) Date of Patent: Aug. 6, 2013

(54) METHOD OF PRODUCT ORDERING AND INVENTORY REPOSITIONING FOR A PROMOTION

(75) Inventors: Debra DallaGrana Miller, Miami Beach, FL (US); George Harry Hoffman, Miramar, FL (US)

(73) Assignee: Restaurant Services, Inc., Coral Gables, FL (US)

( * ) Notice: Subject to any disclaimer, the term of this patent is extended or adjusted under 35 U.S.C. 154(b) by 1705 days.

(21) Appl. No.: 10/801,531

(22) Filed: Mar. 17, 2004

(65) Prior Publication Data

US 2004/0193478 A1 Sep. 30, 2004

Related U.S. Application Data

(60) Provisional application No. 60/458,890, filed on Mar. 31, 2003.

(51) Int. Cl.  
*G06Q 10/00* (2012.01)

(52) U.S. Cl.  
USPC ........................................................ 705/7.25

(58) Field of Classification Search  
USPC .......................................................... 705/10  
See application file for complete search history.

(56) References Cited

U.S. PATENT DOCUMENTS

| | | | | |
|---|---|---|---|---|
| 5,299,115 A * | 3/1994 | Fields et al. | ................ | 705/7.22 |
| 5,491,629 A * | 2/1996 | Fox et al. | ................ | 702/3 |
| 5,521,813 A * | 5/1996 | Fox et al. | ................ | 705/7.29 |
| 5,712,985 A * | 1/1998 | Lee et al. | ................ | 705/7.31 |
| 5,765,143 A * | 6/1998 | Sheldon et al. | ................ | 705/28 |
| 5,832,456 A * | 11/1998 | Fox et al. | ................ | 705/7.31 |
| 5,854,746 A * | 12/1998 | Yamamoto et al. | ................ | 700/106 |
| 5,953,707 A * | 9/1999 | Huang et al. | ................ | 705/7.25 |
| 6,006,196 A * | 12/1999 | Feigin et al. | ................ | 705/7.31 |
| 6,032,125 A * | 2/2000 | Ando | ................ | 705/10 |
| 6,078,891 A * | 6/2000 | Riordan et al. | ................ | 705/7.34 |
| 6,151,582 A * | 11/2000 | Huang et al. | ................ | 705/7.25 |
| 6,167,380 A * | 12/2000 | Kennedy et al. | ................ | 705/7.31 |
| 6,366,890 B1 * | 4/2002 | Usrey | ................ | 705/7.31 |
| 6,493,678 B1 * | 12/2002 | Foster et al. | ................ | 705/28 |
| 6,578,009 B1 * | 6/2003 | Shinozaki | ................ | 705/36 R |
| 6,584,447 B1 * | 6/2003 | Fox et al. | ................ | 705/7.31 |
| 6,609,101 B1 * | 8/2003 | Landvater | ................ | 705/7.25 |
| 6,938,021 B2 * | 8/2005 | Shear et al. | ................ | 705/67 |
| 6,978,249 B1 * | 12/2005 | Beyer et al. | ................ | 705/7.31 |
| 7,069,232 B1 * | 6/2006 | Fox et al. | ................ | 705/7.31 |
| 7,080,026 B2 * | 7/2006 | Singh et al. | ................ | 705/7.31 |
| 7,092,929 B1 * | 8/2006 | Dvorak et al. | ................ | 705/28 |

(Continued)

*Primary Examiner* — Brett Feeney  
(74) *Attorney, Agent, or Firm* — Foley & Lardner LLP

(57) ABSTRACT

A computer implemented method of product ordering and inventory repositioning for a promotion in a supply chain management system utilizing a network is provided. The method comprises obtaining via the network from a plurality of stores in a first region, each store associated with a respective distribution center within the first region, point of sale data for a short period of time relative to a length of time allotted for a current product sales promotion. A computer calculation is caused of a product demand level for stores associated with at least one distribution center for the current product sales promotion based on an outlook model and the point of sale data. A computer calculation is caused of a product amount for the at least one distribution center based at least in part on the product demand level for stores associated with the at least one distribution center. An electronic action is taken based on the product amount for the at least one distribution center.

15 Claims, 8 Drawing Sheets

U.S. PATENT DOCUMENTS

| | | | |
|---|---|---|---|
| 7,103,560 B1* | 9/2006 | Fox et al. | 705/7.34 |
| 7,155,402 B1* | 12/2006 | Dvorak | 705/14.41 |
| 7,379,890 B2* | 5/2008 | Myr et al. | 705/7.35 |
| 7,457,766 B1* | 11/2008 | Noble et al. | 705/7.31 |
| 7,480,623 B1* | 1/2009 | Landvater | 705/7.25 |
| 7,516,083 B1* | 4/2009 | Dvorak et al. | 705/7.31 |
| 7,523,048 B1* | 4/2009 | Dvorak | 705/7.31 |
| 7,552,066 B1* | 6/2009 | Landvater | 705/7.25 |
| 7,580,851 B1* | 8/2009 | Copeland | 705/7.31 |
| 7,644,863 B2* | 1/2010 | Chen et al. | 235/385 |
| 7,657,453 B2* | 2/2010 | Guldner et al. | 705/7.11 |
| 7,660,734 B1* | 2/2010 | Neal et al. | 705/7.29 |
| 7,680,685 B2* | 3/2010 | Ouimet et al. | 705/7.31 |
| 7,689,450 B1* | 3/2010 | Dvorak et al. | 705/7.31 |
| 7,689,456 B2* | 3/2010 | Schroeder et al. | 705/7.31 |
| 7,769,625 B2* | 8/2010 | Veit | 705/7.29 |
| 2001/0014868 A1* | 8/2001 | Herz et al. | 705/14 |
| 2001/0049690 A1* | 12/2001 | McConnell et al. | 707/104.1 |
| 2002/0042755 A1* | 4/2002 | Kumar et al. | 705/26 |
| 2002/0106432 A1* | 8/2002 | Yamagata et al. | 426/496 |
| 2002/0120459 A1* | 8/2002 | Dick et al. | 705/1 |
| 2002/0133385 A1* | 9/2002 | Fox et al. | 705/7 |
| 2003/0009386 A1* | 1/2003 | Menninger | 705/26 |
| 2003/0018513 A1* | 1/2003 | Hoffman et al. | 705/10 |
| 2003/0028417 A1* | 2/2003 | Fox | 705/10 |
| 2003/0061081 A1* | 3/2003 | Kellond et al. | 705/7 |
| 2003/0130883 A1* | 7/2003 | Schroeder et al. | 705/10 |
| 2003/0130905 A1* | 7/2003 | Foster et al. | 705/26 |
| 2003/0200148 A1* | 10/2003 | Razumov | 705/26 |
| 2004/0049427 A1* | 3/2004 | Tami et al. | 705/24 |
| 2004/0059634 A1* | 3/2004 | Tami et al. | 705/17 |
| 2004/0064350 A1* | 4/2004 | Hanazato et al. | 705/7 |
| 2004/0177075 A1* | 9/2004 | Rangadass | 707/10 |
| 2005/0096963 A1* | 5/2005 | Myr et al. | 705/10 |
| 2005/0256759 A1* | 11/2005 | Acharya et al. | 705/10 |
| 2005/0273380 A1* | 12/2005 | Schroeder et al. | 705/10 |

* cited by examiner

METHOD OF PRODUCT ORDERING AND INVENTORY REPOSITIONING FOR A PROMOTION

RELATED APPLICATIONS

This application claims is related to and claims priority from U.S. provisional application 60/458,890 filed on Mar. 31, 2003, the entire contents of which are incorporated by reference.

FIELD OF THE INVENTION

This invention relates to a computer implemented method of product ordering and inventory repositioning for a promotion in a supply chain management system utilizing a network.

BACKGROUND OF THE INVENTION

It is known to use historical product demand data to predict future product demand in the context of management of a supply chain. For example, U.S. Pat. Nos. 5,953,707 and 6,151,582 to Huang et al. are both directed to management of a supply chain. Huang et al. disclose linking point of sale (POS) data, where available, to historical promotion information to analyze the impact of promotion activities on demand for products There is a need, however, in the context of a supply chain system having stores associated with specific distribution centers (DCs), to provide a product demand forecast model that allows POS data obtained for a short time during a promotion to be used to determine the product demand for stores associated with the DCs for the remaining promotion. There is also a need to treat the DCs differently in determining the product demand depending on whether sufficient current POS data has been obtained for stores associated with the DC.

SUMMARY OF THE INVENTION

A first aspect of the present invention relates a computer implemented method of product ordering and inventory repositioning for a promotion in a supply chain management system utilizing a network. The method comprises obtaining via the network from a plurality of stores in a first region, each store associated with a respective distribution center within the first region, point of sale data for a short period of time relative to a length of time allotted for a current product sales promotion, causing a computer calculation of a product demand level for stores associated with at least one distribution center for the current product sales promotion based on an outlook model and the point of sale data, causing a computer calculation of a product amount for the at least one distribution center based at least in part on the product demand level for stores associated with the at least one distribution center, and taking an electronic action based on the product amount for the at least one distribution center.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Figure 1:
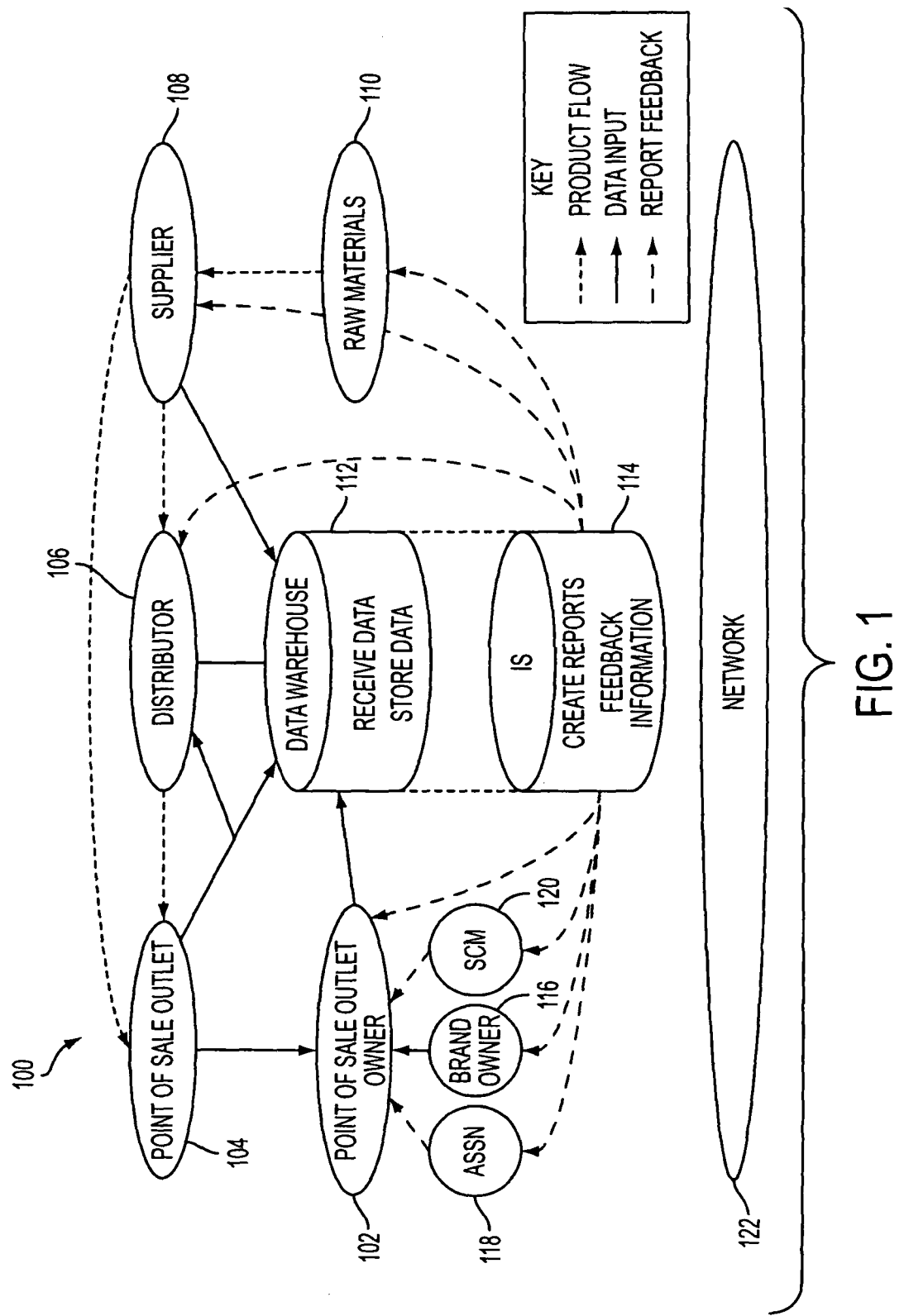
FIG. 1 illustrates an electronic reporting and feedback system according to an embodiment of the present invention.

The present inventors have realized that there is a need to provide a product forecasting model for a product promotion that allows current promotion POS data (POS data obtained during the current promotion period) to be used to forecast the product demand during the promotion at stores associated with each DC in the supply chain, and to determine a product demand for at least one DC.

The present inventors have also realized that the different DCs should be treated differently in determining the product demand for the DC's stores according to whether or not a sufficient amount of current POS data has been obtained for stores associated with the respective DC. In this case a sufficient amount of POS data may be an amount sufficient to make a prediction, such as a statistically significant sample, a statistically predictive sample, a historically predictive sample, or a historically relative sample, for example. In this regard, for those DCs for which a sufficient amount of current POS data has been obtained from stores associated with the DC, the forecast product demand is determined from the current POS data and a prediction model. For those DCs for which a sufficient amount of current POS data has not been obtained, the forecast product demand may be determined based upon the forecast product demand of a DC for which sufficient data has been obtained, if there is a correlation between this DC and another DC for which there is data. If no correlation exists for a given DC, the forecast product demand can be determined based on historical product data during a promotion, such as invoice data, for the DC or by indexing topline sales through such DC to another measurable benchmark such as national topline sales for all DCs, for example.

The invention is described below with reference to drawings. These drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any computer readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention will be described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

The claimed invention is applicable to many different industries, including but not limited to, restaurants, pharmaceuticals, health and personal care products, computer and internet technology, automotive, home product supply, food and beverage, telecommunications, machinery, air conditioning and refrigeration, chemical, department store supply, office product supply, aircraft and airline related industries, education, consumer electronics, hotel, gasoline stations, convenience stores, music and video, etc.

Referring again to the supply chain management system of the present invention, the organizational structure, technology applications and information systems that form portions of the Supply Chain are enablers that allow for effective management of the Supply Chain. The methodology of the present invention provides the means to efficiently capture, analyze and feed back timely Supply Chain data to the appropriate parties.

The present invention includes a supply chain management system involving at least one supply chain participant, and possibly multiple supply chain participants. Supply chain participants include a supply chain manager. The supply chain manager may be a supply chain participant, a department of, division of or consultant for a supply chain participant, or an independent entity unrelated to the other supply chain participants. The supply chain manager may be allowed to exercise management rights without taking title or possession of any goods passing through the supply chain.

Supply chain participants may also include brand owners, point of sale outlets, point of sale outlet owners, a cooperative or consortium of point of sale outlet owners, distributors, or suppliers. Suppliers may supply one or more of finished goods, partially finished goods or raw materials.

In general, the supply chain management system integrates various components, which components may include:
In-Retailer Systems
A Retailer/Distributor Electronic Interface
A Supplier/Distributor Electronic Interface
A Data Warehouse
Information Services
A Network such as a Web Architecture and Internet Access FIG. 1 illustrates an electronic reporting and feedback system 100 according to an embodiment of the present invention.

The In-Retailer Systems support point of sale outlet owners 102 with Point of Sale (POS) and BOH hardware and software solutions. This component enables electronic data collection of daily item sales for the information database.

The Retailer-Distributor Electronic Interface establishes an electronic purchasing system and thus "electronic commerce" between POS outlets 104 and distributors/"direct" suppliers 106, 108. This includes electronic order entry over the network such as via the Web, order confirmation, product delivery/receiving, electronic invoicing, electronic wire payment transfers, data collection, and contract compliance and distributor performance measurement, which assists in managing distributor performance.

The Supplier-Distributor Electronic Interface facilitates the development of electronic commerce between system suppliers and distributors including electronic ordering and confirmations, electronic invoicing and payments and electronic supplier performance measuring and reporting. Electronic commerce between raw material suppliers 110 and suppliers is also provided.

A Data Warehouse 112 is a central collection point that electronically collects and warehouses timely, critical Supply Chain information for all Supply Chain participants. This includes distributor and supplier performance measures, representations of daily outlet item sales with translations to specified product requirements, and inventory levels, sales history and forecasts at various points in the Supply Chain, thereby providing a basis for collaborative planning and forecasting. The data stored in the Warehouse is then available for quick, secure access.

Information Services analyzes 114, organizes and feeds back Supply Chain data to meet the information needs of Supply Chain users such as a brand owner 116, the Supply Chain Coordinator (SCC) 118, retail outlet management 120 and suppliers. This includes information on Supply Chain performance, collaborative planning and forecasting, promotion planning and inventory management. Services that benefit franchisees include electronic invoice auditing, distributor performance reporting, cost reporting and analysis, franchisee sales/cost comparables, and other reports. Information Services also determines a proper format in which to present the data so that it is in the most useful form for the end user. It also works with Supply Chain users to develop/evaluate analytical/operational tools.

A network 122 is provided to underlie this supply chain structure. In one embodiment the network may comprises a web architecture with Internet access (through proprietary service or an Internet Service Provider (ISP)) that allows these electronic communications to take place efficiently and effectively. Encompassed in this component is the building of initial web applications and security for the Supply Chain.

Figure 2:
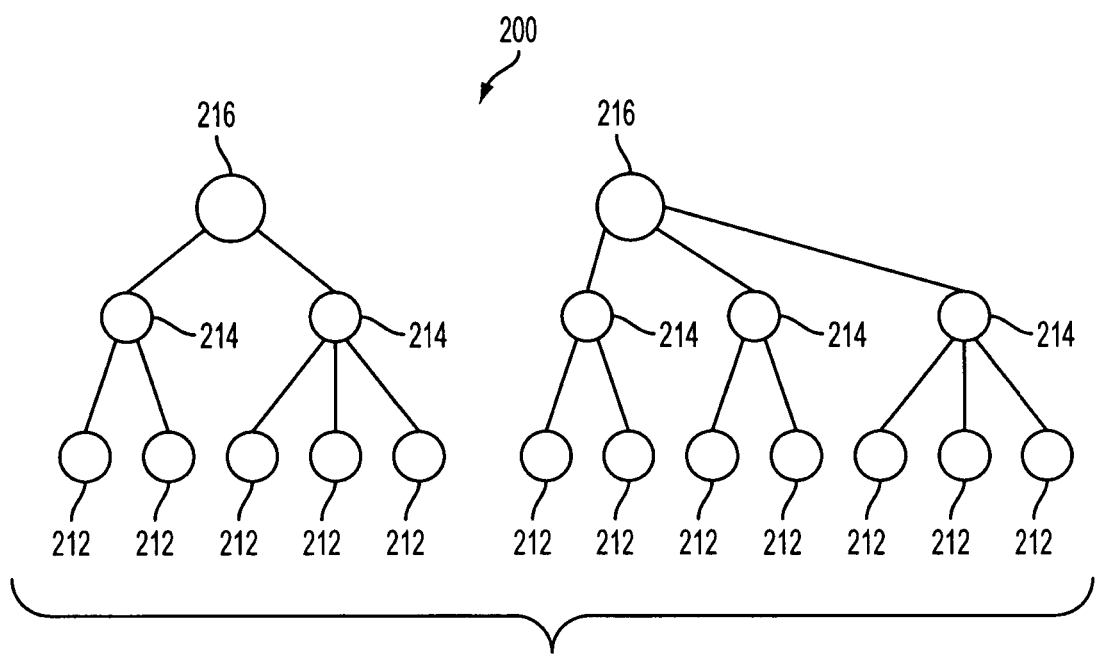
FIG. 2 illustrates the organization of the components of a supply chain system according to an embodiment of the present invention.

FIG. 2 illustrates the organization of the elements in a supply chain system 200 according to one embodiment of the invention. A supply chain management system, such as that described above, is associated with the supply chain system 200 to manage product information for the supply chain system. The supply chain system 200 includes a plurality of stores 212, distribution centers (DCs) 214, and suppliers 216. Each store 212 in the supply chain system 200 may order products from an associated one of the DCs 214. In this application, the term "store" includes entities such as restaurants and factories, which order products from a DC 214. The term DC means an entity in the supply chain from which products may be transferred to the stores 212. The term supplier 216 means an entity in the supply chain from which products may be transferred to the DCs 214 or stores 212. A supplier 216 may also act as a DC. Both the suppliers 216 and DCs 214 may include product manufacturers. The association between a store 212 and its associated DC 214 or from a DC 214 and its associated supplier 216 is indicated in FIG. 2 by a line from the store 212 and the DC 214, or DC 214 and supplier 216, respectively.

The DCs 214 deliver products ordered by the stores 212, and keep an inventory of the products at the DC 214 and keep invoice data detailing the products ordered. The DCs 214 order products from the suppliers 216, which in turn deliver those ordered products to the DCs 214.

FIG. 2 illustrates only a few suppliers 216, DCs 214, and stores 212, for ease of illustration. In general the supply chain system 200 may include many more suppliers 216, DCs 214 and stores 212. The stores 212 in the supply chain system 200, for example, may number in the thousands or tens of thousands. Further, FIG. 2 illustrates each store 212 being associated with only one DC 214. Alternatively, a store 212 may be associated with more than one DC 214.

Product data may be stored in an electronic fashion in the supply chain management system, such as that described with respect to FIG. 1, associated with the supply chain system 200. The supply chain management system manages the product information regarding the supply chain system. The product data includes, for example, product inventory data for inventory at the stores 212, DCs 214, and suppliers 216, point of sale (POS) data indicating the daily product sales at the stores 212, daily invoice data at the DCs 214 indicating the product orders shipped to the stores 212, and daily invoice data at the suppliers 216 indicating the product orders by the DCs 214.

The product data may also include, in addition to the type of product, the date the product was sold, and information regarding any product promotions in the supply chain occurring on the date the product was sold. The information regarding the product sales promotion may include, for example, the type of products promoted during the product sales promotion, and the beginning and ending date of the product sales promotion (and thus the duration of the promotion).

The product data may be electronically stored at one or more locations in the supply chain management system. For example, the POS data of the stores may be stored at the individual stores (point of sale outlet 106 in FIG. 1), and/or at the DCs (distributor 106 in FIG. 1), and/or at other locations where the data may be stored, such as the data warehouse 112 in FIG. 1.

In addition to current daily POS data, and current DC and supplier invoice data, historical DC and supplier invoice data and POS data are collected in the supply chain management system. In this application, historical data means data relating to product sales occurring prior to a current product promotion period. In this application, current data means data relating to product sales occurring during a current product promotion period.

Figure 3:
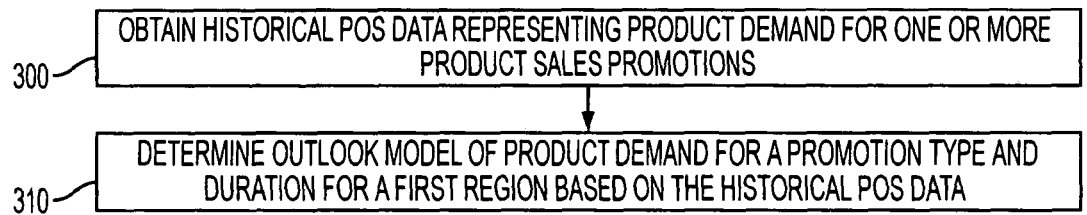
FIG. 3 is a flow chart illustrating the steps of determining an outlook model according to an embodiment of the present invention.

FIG. 3 is a flow chart illustrating an exemplary embodiment of how an outlook model for forecasting product sales volume, and thus the product demand, at the stores is determined for a product sales promotion. The invention is not limited to the particular outlook model disclosed below, and other outlook models that provide a forecast based on current POS data may be used. Referring to block 300, historical POS data representing product demand at a plurality of the stores during one or more historical product sales promotions is obtained. The obtained historical data may be electronically stored so as to be available to a processor within the supply chain management system, which will perform a calculation to determine the outlook model.

The historical data includes data characterizing a type of promotion, i.e., the type of product or products promoted during the promotion, the time of year of the promotion, and the duration or period of the promotion. As an example, the historical data may include an indication that a single product, a cheeseburger, was at a reduced price, or otherwise promoted, at restaurants (stores) in the supply chain during the promotion, and that the promotion began on a Monday on a certain date and ended on a Sunday, two weeks later. In one embodiment, sales data for all of the products sold at the restaurant is obtained to thereby allow a determination of how the promotion effects the sales of other products not offered at a reduced price. Such data would allow a determination of cannibalization effects where a promotion for one product may cause sales of another product to be reduced, or of effects where a promotion for one product may cause sales of another product to be increased. As another example, the historical data may include an indication that two products, a cheeseburger and a fish sandwich, were on sale at restaurants (stores) in the supply chain during separate promotions, which overlapped.

Referring to block 310, the outlook model for product sales demand for a particular promotion type and duration over a first region is determined based on the obtained historical POS data. The first region may be a geographical region, such as a state or nation, for example. The first region may also be a group of DCs which are not within a particular geographical region, or a single DC. In one embodiment, the first region encompasses some or all of the stores within the supply chain system and the DCs associated with those stores. In one embodiment, the outlook model forecasts the sales volume for an average store within the first region (average in the sense of product sales volume) in the supply chain during a product promotion. Alternatively, the outlook model may forecast the total sales volume for all of the stores within an average DC within the first region (average in the sense of product sales volume) in the supply chain during a product promotion. In general, the outlook model provides a prediction of the product sales volume (and thus demand level) for a store or stores in the first region given a set of input POS data obtained over a period of a current product promotion. In general, the outlook model need not be determined by finding the sales volume for an average store in the first region.

The historical data used in determining the outlook model for a particular promotion type and duration may include POS data for that particular product type, and for promotions having similar duration. For example, if the outlook model is for a product promotion for cheeseburgers, with a promotion duration of two weeks, historical data for cheeseburger promotions with a duration of about two weeks may be used in determining the outlook model. The time of year for the promotion or any of a variety of other factors may be used in creating or selecting an appropriate outlook model.

The historical POS data in general need not include POS data from all of the stores in the first region. For example, some of the stores within the first region may have been added since the date of the sales of the historical POS data. Also, some of the stores may not have reported POS data within the supply chain management system. In one embodiment, the outlook model is determined based only on the historical POS data which has been obtained. In another embodiment, the historical data may be weighted accordingly in creating the outlook model to account for the fact that the historical data is not from all of the stores in the first region. As an alternative, correlations between stores may be used to estimate sales data for non-reporting stores.

Figure 4A:
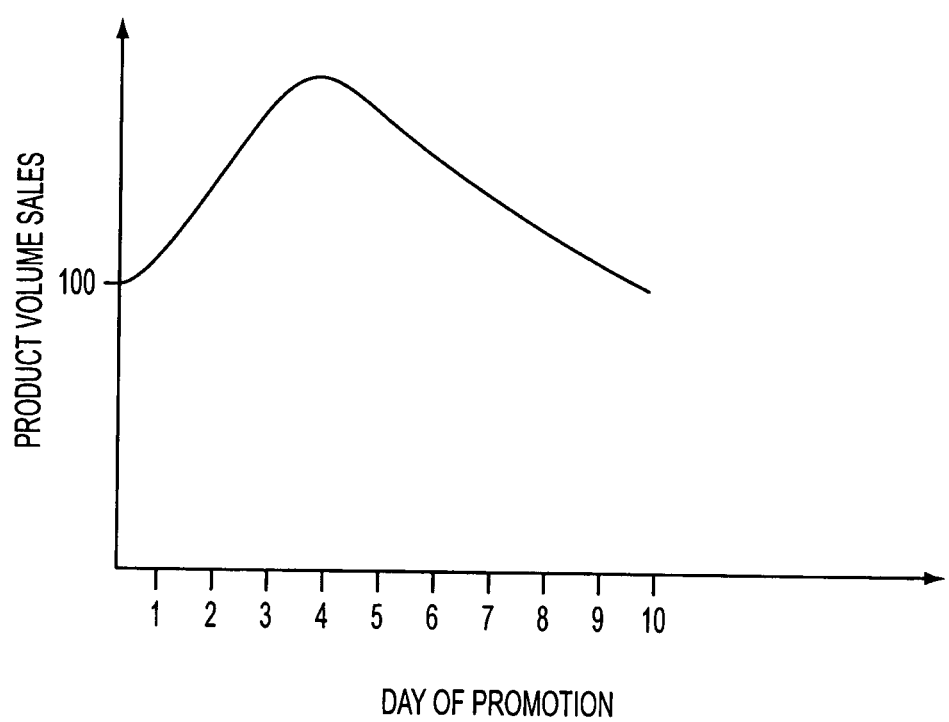
FIG. 4A is a graph illustrating the volume sales on average for an average store over a promotion for an outlook model according to an embodiment of the present invention.
Figure 4B:
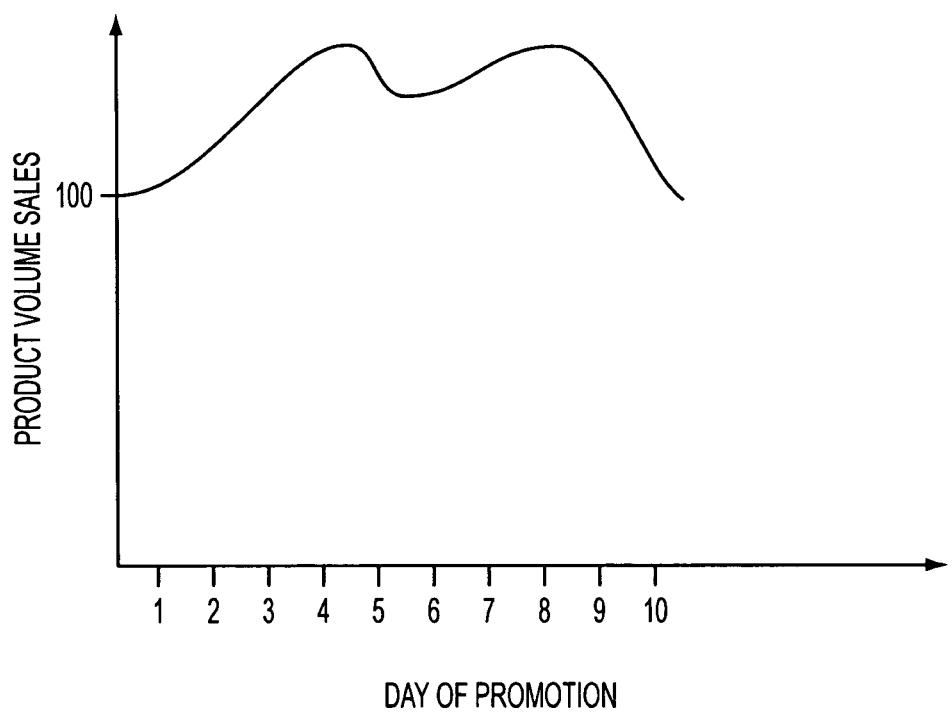
FIG. 4B is a graph illustrating the volume sales on average for an average store over a promotion for an outlook model according to another embodiment of the present invention.

FIGS. 4A and 4B are examples of volume sales for an average store for two different outlook models according to an embodiment of the present invention. In the outlook model of FIG. 4A, the product volume sales in an average store steadily rises to a maximum, and then decreases until the end of the promotion. In the outlook model of FIG. 4B, the product volume sales reaches a maxima twice during the promotion. The average volume sales for the entire promotional period may be readily determined using the daily sales volume shown in FIGS. 4A and 4B.

Figure 5:
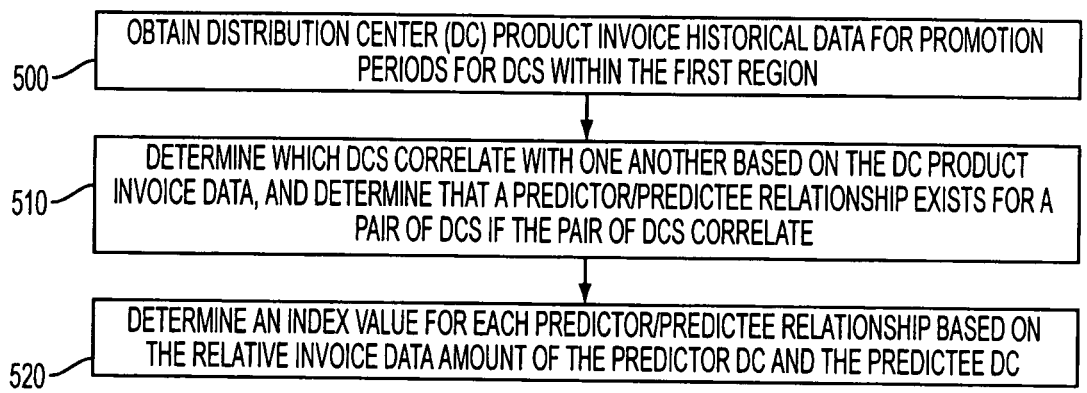
FIG. 5 is a flow chart illustrating the steps of determining whether a predictor/predictee relationship exists for distribution centers (DCs) in a supply chain, and determining a predictor/predictee index value.

FIG. 5 is a flow chart illustrating steps of determining whether a predictor/predictee relationship exists between a pair of DCs, and determining an index value for those DC pairs for which a predictor/predictee relationship exists. Referring to block 500, historical DC product invoice data for the DCs is obtained via the supply chain management network, where the historical invoice data is indicative of products ordered for historical product sales promotions from the DCs by stores associated with the respective different DCs.

While the invoice data relates to product volume sales for stores associated with a DC, the invoice data is not product volume sales data per se. The product invoice data is for products ordered by stores associated with the DC, and may in general include the product types ordered, the amount ordered, and the date. The invoice data may be data regarding products ordered by the stores on a per day basis, or on a weekly basis, or on some other time basis. In one embodiment, the invoice data is data regarding products ordered by the stores on a per day basis. The product invoice data provides an indication of the product sales of the stores associated with a DC, and thus the product demand for the stores. The obtained historical invoice data may be electronically stored so as to be available to a processor within the supply chain management system which will perform a calculation of a correlation between DCs.

Referring to block 510, it is determined whether or not DCs correlate with one another for a particular promotion type and duration based on the historical invoice data. For a particular promotion type and duration, a particular pair of DCs correlate if they exhibit similar patterns over time in invoice data for a unique product. The correlation may be determined using any convenient method and data parameters, such as, for example regression analysis. The invention is not limited to the particular method used for determining the correlation. If a pair of DCs exhibits at least a predetermined correlation, it is determined that a predictor/predictee relationship exists between that pair of DCs. Of course, in general a predictor/predictee relationship may exist between any number of DCs.

After it is determined whether or not a predictor/predictee relationship exists between pairs of DCs, a predictor/predictee index value is determined for each predictor/predictee relationship as shown in block 520. The index value allows the product sales volume relating to the predictee DC to be predicted if a product sales volume relating to predictor DC is known. The product sales volume relating to the DC may be the product sales volume for an average store (in terms of sales volume) associated with the DC or the total sales volume for all of the stores associated with the DC.

The index value is calculated based on the relative historical invoice data amount for stores in the predictor/predictee DCs. For example, for a particular predictor/predictee relationship between one DC (DC#1) and another DC (DC#2), the historical invoice data may indicate that the ratio of the invoice data amount for DC#2 to the invoice data amount for DC#1 is 1.5. Thus, the index value for the predictor/predictee pair, DC#1/DC#2, is 1.5. Of course, if the index value for the DC#1-DC#2 relationship is known, the index value for the inverse relationship, i.e., DC#2-DC#1, is readily calculated. That is, if the index value for the DC#1-DC#2 relationship is 1.5, the index value for the inverse relationship is 1/1.5 or about 0.67.

The index value for a particular predictor/predictee pair allows the forecast sales volume for the stores of the predictee DC to be calculated over a sales promotion if the forecast sales volume for the stores of the predictor DC has been determined and thus indicates the ratio of the product sales volume for stores in the predictee distribution center to the product sales volume for stores in the predictor distribution center determined based on the index derived from historical product invoice data. For example, if it has been determined that the stores of the predictor DC are forecast to have an average sales volume per day of 120 over the promotion, then the forecast sales volume (average store sales volume per day) of the predictee DC is 120 times the predictor/predictee index.

Figure 6A:
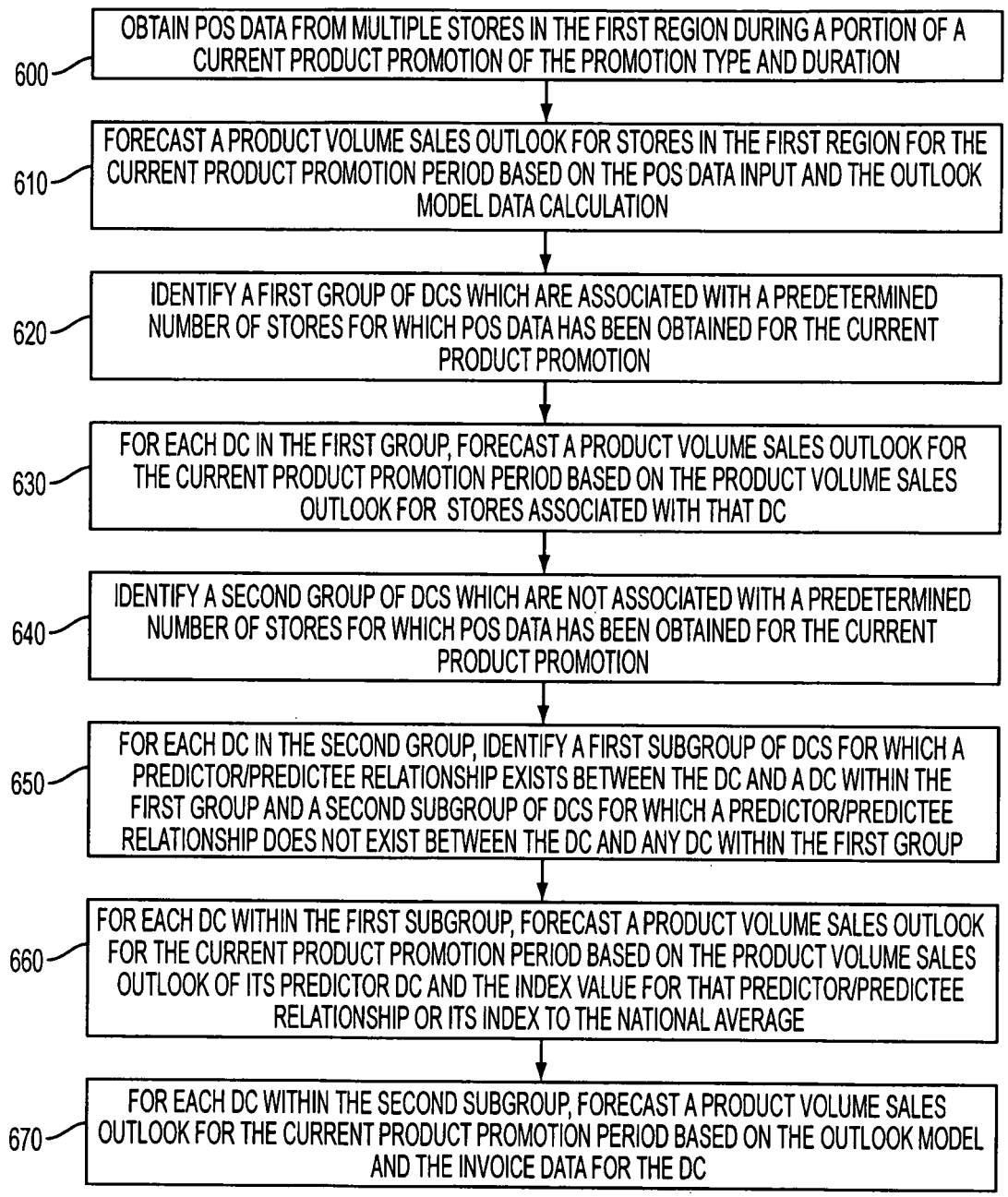
FIGS. 6A and 6B are flow charts illustrating how the product sales volume for the outlook for the DCs in a first region is determined for a current product sales promotion.
Figure 6B:
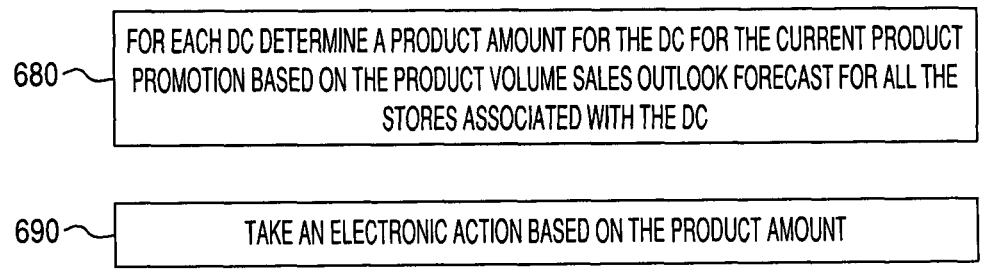

FIGS. 6A and 6B are flow charts illustrating one embodiment of how the product sales volume outlook (and thus the demand level) for at least one DC in the first region is determined for a current product promotion based on the outlook model and obtained point of sale data. In block 600, the current POS data, i.e., POS data for sales occurring during the current product sales promotion, is obtained via the supply chain management system from multiple stores in the first region during a first period of the current product promotion having a particular promotion type and duration, where each store is associated with a respective DC in the first region. For example, the current product promotion type may be a product promotion for cheeseburgers, and the duration may be two weeks. The obtained current POS data may be electronically stored so as to be available to a processor within the supply chain management system which will perform a calculation of the product sales volume outlook for the stores in the first region.

The POS data obtained is for a first period of the current product promotion. In one embodiment, the POS data may be obtained for sales occurring for a day or days at the beginning of the promotion, so that the volume outlook sales for the entire promotion period may be determined. In one embodiment, the POS data may be obtained for a short period of time relative to the length of time allotted for a current product sales promotion.

The POS data may be obtained for all of the stores in the first region, or for only some of the stores in the first region. In one embodiment, the POS data may be taken for a majority of the stores in the first region.

In block 610, the product volume sales for stores for which POS data has been obtained is forecast for the first region for the current product promotion period based on the POS data input obtained and the outlook model calculation, such as determined in blocks 300 and 310 of FIG. 3. The POS data used may be for a single day of the promotion, or for any number of days. The POS data for one or more days may be fitted to the outlook model, such as one of the outlook models illustrated in FIGS. 4A and 4B, using conventional data fitting routines, such as a least squares fit, for example.

The outlook may also be revised as the promotion continues, and further POS data is obtained. For example, POS data from a first day of the promotion may be used to provide an initial forecast of the product volume sales for the stores. POS data from a second day may then be used to refine the forecast. POS data from a third day may then be used to further refine the forecast, and so on.

One example according to an embodiment of forecasting the product volume sales for a store, and thus the demand, is as follows. Assume that the POS data for the first three days in a promotion from stores reporting from the first region yields an average sales volume per store in the first region of 100 sandwiches per day. Plugging the 100 sandwiches per day into an appropriate outlook model may result in a predicted average product sales volume per store per day over the entire promotion of 150 sandwiches.

In block 620, a first group of DCs are identified for the current product promotion, where each DC in the first group has a predetermined number of associated stores reporting POS data (for example, the predetermined number may be 1 store, 5 stores, or all stores). In one embodiment, the predetermined number of stores may be a number which provides sufficient POS data to provide a statistically significant sample.

In block 630, for each DC in the first group, the product volume sales outlook (and thus the product demand level) for the promotion period for the current product promotion is forecast based on the product volume sales forecast for stores associated with that DC. By way of example, for three days of reported POS data from stores associated with a given DC assume that an average per store per day sales volume for such associated stores is 90 sandwiches. Using the previous example, each of the stores in the first region reporting an average per day per store sales of 100 sandwiches to yield a predicted average product sales volume per store per day of 150 sandwiches, then a forecast of product volume sales for the given DC on a per store per day basis can be determined as follows: (90/100) times 150 yields 135 sandwiches per store per day for that DC. Alternative calculations may be used depending on the outlook model used. These forecasts are based on the outlook model and the POS data obtained from stores associated with the DC during the current product promotion.

Note that for individual DCs in the first group, there may be POS data obtained from only some of the stores in that DC. According to one embodiment, for those stores within a particular DC for which no POS data has been obtained, it is assumed that these stores act in a similar fashion to those stores in the DC for which POS data has been obtained, and the product volume sales are estimated accordingly. For example, if for the DC on the first day of the current promotion, there is on average a 10% increase in product volume sales for the stores as compared to normal product volume sales, it is presumed that those stores within that DC for which no POS data has been obtained will also exhibit a 10% increase in product volume sales. In an alternative embodiment, historical data for the stores may be used to determine a correlation factor between stores, to thereby allow a store's volume sales to be predicted using the correlation factor.

Referring to block 640, a second group of DCs is identified, where the DCs in the second group do not have the predetermined number of associated stores for which POS data has been obtained during the current promotion. Referring to block 650, for each of the DCs in the second group, a first subgroup of DCs for which a predictor/predictee relationship exists between that DC and a DC within the first group is identified. Also, in block 650, from the DCs in the second group, a second subgroup of DCs is identified for which a predictor/predictee relationship does not exist between the DC and any DC within the first group.

Referring to block 660, for each of the DCs in the first subgroup, the product volume sales outlook (and thus the product demand level) for stores associated with that DC is forecast based on the product sales volume outlook of the predictor DC from the first group and the index value for that predictor/predictee relationship or its index to the national average. In one embodiment the index value relates the product sales volume for an average store associated with a predictee DC with the product sales volume of an average store of its predictor DC. If the product sales volume outlook of an average store of the predictor DC for the entire promotion period has been determined to be 100 per day, the product sales volume outlook of an average store of the predictee DC for the entire promotion period is 100 per day times the predictor/predictee index in this embodiment.

Referring to block 670, for each of the DCs in the second subgroup, the product volume sales (and thus the product demand level) for the associated stores is forecast for the current product promotion period. In one embodiment, this forecast may be based on the outlook model and the historical invoice data for the DC. For example, if the historical invoice data for the DC indicates that the normal volume sales for an average store per day in the DC (volume sales for the product when a promotion for that product is not occurring) is equal to 80 sandwiches, and the forecast volume sales for the promotion period for an average store indicates that during the promotion product sales volume increases by 40% on average per day, the product volume sales outlook for the average store in the DC will be 112 over the promotion period. A wide variety of other methods may be used in place of the foregoing to calculate an estimate of product sales volume for DCs in this second subgroup.

Referring to block 680, the product amount for the DC is calculated for the current product promotion based on the product volume sales outlook forecast for stores associated with the DC. The product amount for the DC is the total product volume sales outlook for the current promotion period for all of the stores associated with the DC. For example, if the product volume sales outlook forecast for all the stores in a DC indicates that 100 sandwiches will be sold per day over a two week promotion and assuming the DC has 10 stores associated with it, then it may be determined that (100)(14)(10)=14,000 cheeseburgers will be sold for the promotion.

A product component amount for a DC may be determined based on the product amount for the DC and a product component file. The component file lists the components of the promotional product and the amount of each component in the product. For example, if the promotional product is a cheeseburger, the component file may list components such as: one bun, one hamburger patty, one slice of cheese, two pickle slices, ¼ ounce ketchup, etc. If the product amount is 14,000 cheeseburgers, the amount of hamburger patties needed would be 14,000, while the amount of pickle slices needed would be 28,000, and this would be indicated in the product component amount.

Referring to block 690, an electronic action, based on the product amount for each DC is taken. The action could be any one or more of a number of possible actions. For example, the electronic action could comprise communicating using any convenient method, the predicted product amount to the respective DC. In an alternative embodiment, a needed inventory amount may be displayed electronically in an alert message to a DC. The needed inventory amount may be determined based on the product amount, and product inventory within the supply chain and accessible by at least one DC or the stores associated with the at least one DC. This accessible inventory may include the inventory already stocked at a DC and stores associated with the DC, or in transit thereto. Accounting for the current location of the product components could be performed based on tracking inventory within the supply chain. Tracking may be performed by scanning a bar code on an inventory package as it moves through the system or by scanning invoice data, for example. The action may also comprise posting the needed inventory amount to a website.

The action may comprise a number of other possibilities, either alone, or in combination. An electronic message could be sent to appropriate DCs indicating that inventor should be shifted between DCs or between stores to account for the different product inventory needs during the product promotion. The action could also comprise repositioning inventory or generating a purchase order for additional products based at least in part on the needed inventory amount.

As a further example, the expected amount of product needed at a store could be determined based on a correlation factor for example, and electronically sent to a plurality of the stores of a DC or of the entire first region. The stores would then have the information regarding the forecast product needed at the store during the promotion, and could send orders to their DC accordingly.

In addition to forecasting the volume sales of a first product during a current product promotion for a first product, the volume sales of a second product, which is not being promoted, may also be determined. In one embodiment, historical POS data is obtained from stores regarding a change (an increase or a reduction) of sales of the second product during a promotion period for the first product. The POS data in this case includes POS data for the second product in addition to POS data for the first product. An outlook model for the second product may be determined in a similar fashion to earlier embodiments discussed above. Additionally, a second product change index for the second product is determined correlating the sales of the second product to the outlook model of the second product. The second product change index may be based on the historical point of sale data for the second product.

A forecast of the change in the sales (and thus the demand level) for the second product for the stores associated with the DCs is then determined based on the second product outlook model, the second product change index, and current POS data, which may include POS data for both the first and second products. Product amounts for each DC and needed product inventory for the second product may then be determined in a similar fashion to that described above, and an appropriate electronic action taken, with respect to the second product.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer implemented method of product ordering and inventory repositioning for a promotion in a supply chain management system utilizing a network, comprising:
   obtaining, during a current product sales promotion, via the network from a plurality of stores in a first region, each store associated with a respective distribution center within the first region, point of sale data for a first period of time less than a length of time allotted for the current product sales promotion;

causing, during the current product sales promotion, a computer calculation of a product demand level over a remaining period of the current product sales promotion for stores associated with at least one distribution center based on an outlook model and the point of sale data;

causing, during the current product sales promotion, a computer calculation of a product amount for the at least one distribution center based at least in part on the calculated product demand level for stores associated with the at least one distribution center; and taking, during the current product sales promotion, an electronic action based on the product amount for the at least one distribution center, wherein the causing a computer calculation of a product demand level for stores associated with at least one distribution center comprises:

obtaining via the network from multiple distribution centers in the supply chain historical invoice data, the historical invoice data indicative of products ordered for historical product sales promotions from the distribution centers by stores associated with the respective different distribution centers;

causing a computer determination of correlations among multiple distribution centers based on the historical invoice data, and indicating that a predictor/predictee relationship exists between pairs of the distribution centers if the pair of distribution centers exhibits at least a predetermined correlation; and causing a computer calculation of a predictor/predictee index value for the predictor/predictee pairs based on the historical invoice data, where the predictor/predictee index value indicates the ratio of the product sales volume for stores in the predictee distribution center to the product sales volume for stores in the predictor distribution center determined based on the historical product invoice data.

2. The method of claim 1, wherein the causing a computer calculation of a product demand level for stores associated with at least one distribution center comprises:

when point of sale data has not been obtained during the current product sales promotion for a threshold number of stores associated with one distribution center and when there is no predictor/predictee relationship between the one distribution center and any of the distribution centers for which point of sale data has been obtained for the threshold number of stores during the current product sales promotion, causing a calculation of a product demand level of stores associated with the one distribution center based on historical invoice data for the one distribution center and the outlook model.

3. A computer implemented method of product ordering and inventory repositioning for a promotion in a supply chain management system utilizing a network, comprising:

obtaining, during a current product sales promotion, via the network from a plurality of stores in a first region, each store associated with a respective distribution center within the first region, point of sale data for a first period of time less than a length of time allotted for the current product sales promotion;

causing, during the current product sales promotion, a computer calculation of a product demand level over a remaining period of the current product sales promotion for stores associated with at least one distribution center based on an outlook model and the point of sale data;

causing, during the current product sales promotion, a computer calculation of a product amount for the at least one distribution center based at least in part on the calculated product demand level for stores associated with the at least one distribution center; and taking, during the current product sales promotion, an electronic action based on the product amount for the at least one distribution center, wherein the causing a computer calculation of a product demand level for stores associated with at least one distribution center comprises:

causing a computer calculation of a product demand level for the stores associated with a first distribution center for the current product sales promotion based on the outlook model and on point of sale data for the first period of time obtained from at least one store associated with the first distribution center; and when a predictor/predictee relationship exists between the first distribution center and a second distribution center, causing a computer calculation of a product demand level for the stores in the second distribution center for the current product sales promotion based on the product demand level calculated for the first distribution center and a predictor/predictee index value for the first and second distribution centers, wherein the product demand level for the stores in the second distribution center is calculated to be the product demand level for the stores in the first distribution center multiplied by the predictor/predictee index.

4. The method as defined in claim 3, wherein the outlook model is for the first region, and wherein the causing a computer calculation of a product demand level for stores associated with at least one distribution center is based at least in part on a product demand level for the stores in the first region for the current product sales promotion based on the outlook model and the point of sale data.

5. The method of claim 4, wherein the causing a computer calculation of a product demand level for stores associated with at least one distribution center comprises:

causing, during the current product sales promotion, a computer calculation of a product demand level for stores associated with one distribution center for the current product sales promotion based on the outlook model and on point of sale data for the first period of time obtained from at least one store associated with the one distribution center.

6. The method of claim 5, wherein the calculation of the average product demand level per day for the stores associated with the one distribution center comprises multiplying a per day average product demand level over the first period of time for an average store associated with the one distribution center by the per day average product demand level over the promotion for an average store within the first region, and dividing by the per day average product demand level for the average store within the first region over the short period of time.

7. The method of claim 4, wherein the product demand level calculated for the stores in the first region includes a demand level for stores for which no point of sale data has been obtained in the current product promotion.

8. The method of claim 3, wherein the causing a computer calculation of a product demand level for the stores in the second distribution center is performed only when point of sale data has not been obtained during the current product sales promotion for a threshold number of stores associated with the second distribution center.

9. The method of claim 3, wherein the determination of the correlation between the first distribution center and the second distribution center is based on historical invoice data from at least one historical product sales promotion.

10. The method of claim 3, further comprising:

causing, during the current product sales promotion, a computer calculation of a product component amount for the at least one distribution center based on the product amount for the at least one distribution center and a component file listing the product components of the product.

11. The method of claim 3, further comprising causing a computer calculation of a product inventory needed at the at least one distribution center based at least in part on the product amount for the at least one distribution center, and product inventory within the supply chain and accessible by the at least one distribution center or the stores associated with the at least one distribution center.

12. The method as defined in claim 11, wherein the electronic action comprises displaying electronically the product inventory needed in an alert message.

13. The method as defined in claim 11, wherein the electronic action comprises posting the product inventory needed to a website.

14. The method as defined in claim 11, wherein the electronic action comprises repositioning inventory or generating a purchase order for additional products based at least in part on the product inventory needed.

15. The method as defined in claim 3, wherein the outlook model is for a first product, and further comprising:

causing a computer calculation of a second product change index based on historical point of sale data for a second product;

causing, during the current product sales promotion, a computer calculation of a product demand level for the second product for the stores associated with the at least one distribution center for the current product sales promotion based on an outlook model for the second product, the second product change index, and point of sale data obtained during the current promotion.

* * * * *

UNITED STATES PATENT AND TRADEMARK OFFICE
CERTIFICATE OF CORRECTION

Page 1 of 1

| | |
|---|---|
| PATENT NO. | : 8,504,406 B2 |
| APPLICATION NO. | : 10/801531 |
| DATED | : August 6, 2013 |
| INVENTOR(S) | : Miller et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1896 days.

Signed and Sealed this
Twenty-seventh Day of January, 2015

Michelle K. Lee
*Deputy Director of the United States Patent and Trademark Office*